United States Patent
Hardacker et al.

(10) Patent No.: US 8,538,324 B2
(45) Date of Patent: Sep. 17, 2013

(54) MOBILE PHONE DOCK FOR TV

(75) Inventors: Robert Hardacker, Escondido, CA (US); Christopher Jensen Read, San Diego, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1109 days.

(21) Appl. No.: 12/364,651

(22) Filed: Feb. 3, 2009

(65) Prior Publication Data

US 2010/0194981 A1 Aug. 5, 2010

(51) Int. Cl.
*H04H 40/00* (2008.01)
*H04N 5/64* (2006.01)

(52) U.S. Cl.
USPC .......................... 455/3.06; 455/557; 348/839

(58) Field of Classification Search
USPC ............... 348/836, 837, 838, 839, 840, 841, 348/842, 552, 553; 455/3.04, 3.06, 66.1, 455/557, 566
See application file for complete search history.

(56) References Cited

U.S. PATENT DOCUMENTS

| | | | |
|---|---|---|---|
| 4,349,701 A | 9/1982 | Snopko | |
| 4,356,509 A | 10/1982 | Skerlos et al. | |
| 4,392,022 A | 7/1983 | Carlson | |
| 5,566,226 A * | 10/1996 | Mizoguchi et al. | 455/558 |
| 5,990,882 A * | 11/1999 | Heinonen et al. | 725/133 |
| 6,882,709 B1 | 4/2005 | Sherlock et al. | |
| 7,027,768 B2 * | 4/2006 | Hill | 455/3.06 |
| 7,266,391 B2 * | 9/2007 | Warren | 455/557 |
| 7,330,737 B2 * | 2/2008 | Mahini | 455/557 |
| 7,363,002 B2 * | 4/2008 | Hill | 455/3.06 |
| 8,000,647 B2 * | 8/2011 | Hill | 455/3.06 |
| 2001/0043687 A1 | 11/2001 | Tidwell et al. | |
| 2002/0086703 A1 * | 7/2002 | Dimenstein et al. | 455/557 |
| 2002/0103007 A1 | 8/2002 | Jaggers et al. | |
| 2002/0103008 A1 * | 8/2002 | Rahn et al. | 455/557 |
| 2002/0119800 A1 * | 8/2002 | Jaggers et al. | 455/550 |
| 2002/0186329 A1 * | 12/2002 | Tong et al. | 348/839 |
| 2003/0025674 A1 * | 2/2003 | Watanabe | 345/168 |
| 2003/0040334 A1 | 2/2003 | Lee | |
| 2006/0232578 A1 | 10/2006 | Reinhorn | |
| 2006/0259942 A1 | 11/2006 | Toyama et al. | |
| 2007/0076131 A1 * | 4/2007 | Li et al. | 348/738 |
| 2007/0107019 A1 | 5/2007 | Romano et al. | |
| 2008/0152109 A1 | 6/2008 | Bartfeld et al. | |
| 2009/0109881 A1 | 4/2009 | Li et al. | |
| 2009/0125948 A1 | 5/2009 | Kuhlke et al. | |

(Continued)

FOREIGN PATENT DOCUMENTS

KR 3028104 4/2003
WO 99/66647 12/1999

OTHER PUBLICATIONS

Alcatel, "Fixed Solutions Division, Alcatel 5900 Communications TV Release 2.0", Oct. 13, 2006.

(Continued)

*Primary Examiner* — James Buckle, Jr.
(74) *Attorney, Agent, or Firm* — Sony Corporation

(57) ABSTRACT

A mobile telephone docking station that makes use of a TV as a display and that allows use of a standard keyboard and mouse to have a faster, more comfortable means to control the phone. Access to all of the cell phone's functions is allowed through the docking station/TV.

17 Claims, 2 Drawing Sheets

(56) References Cited

U.S. PATENT DOCUMENTS

2009/0251526 A1 10/2009 Book
2009/0284664 A1 11/2009 Barry et al.
2010/0149498 A1 6/2010 Chung et al.
2010/0151904 A1 6/2010 Karaoguz et al.

OTHER PUBLICATIONS

Carve, "Bluetooth Your Phone to Your TV", http://crave.cnet.co.uk, Feb. 16, 2006.
Peter Shintani, Koichi Oshima, Toshiyuki Suzuki, "TV Acting as Pots Phone Switch", file History of pending U.S. Appl. No. 12/553,349, filed Sep. 3, 2009.
Zhimei Wu, Jun Wnag, Huanqiang Zhang/ Institute of Software, Chinese Academy of Sciences, "Community network with Intergrated Services", http://www.springlink.com/content/9yqbv3q0lu9lcv9n/fulltext.pdf?page=1.
Mobilewhack, "TV Remote Control and Phone", http://www.mobilewhack.com, Oct. 26, 2007.
Humphrey Cheung, "CES 2008—Redfly, a docking station for your mobile phone", http://www.tgdaily.com/content/view/35508-145/; Jan. 7, 2008.
Darren Murph, "Sony Ericsson patents cellphone docking station", http://www.engadgetmobile.com/2007/02/01/sony-ericsson-patents-cellphone-docking-station/; Feb. 1, 2007.

* cited by examiner

TV GUI

MOBILE PHONE DOCK FOR TV

FIELD OF THE INVENTION

The present invention relates generally to mobile telephone docking stations for TVs.

BACKGROUND OF THE INVENTION

Mobile telephones have become much more powerful in recent years, including capabilities for web browsing, email, and many other applications. As understood herein however, text entry, screen size, and so forth are very limited. When portability is required it is convenient to have the increased telephone capability but when at home, for instance, the present invention recognizes that it would be advantageous to exploit improved interfaces with which to work.

SUMMARY OF THE INVENTION

As understood herein, it would be advantageous to provide a docking station to enable use of a TV display with mobile telephone computing applications.

Accordingly, a system includes a TV with a TV display and a dock communicating with the TV and configured to receive a mobile telephony device. The dock communicates with the mobile telephony device such that demanded images from the mobile telephony device, including demanded images associated with placing and/or receiving telephone calls, are presented on the TV display.

The dock may include a keyboard, keypad, or may communicate with a keyboard/keypad through a wired or wireless interface such as a universal serial bus (USB) interface, game console interface, infrared or radiofrequency interface for, e.g., Bluetooth, etc. In one vision of the invention the dock provides any human interface devices (remote control keyboard, mouse) that are available to interface with the TV, not just those attached to the dock, available to control the telephone. The dock may also include a point and click input device. The demanded images may be associated with one or more computer applications such as but not limited to graphic user interfaces (GUI) which are executable by the mobile telephony device.

The TV includes a tuner and the system can include a switch operable to select input to the TV between at least the tuner and the dock. The switch can be configured to send input from the dock to the TV display automatically when the mobile telephony device is mechanically engaged with the dock in a predetermined docking position. Or, the switch can be configured by use of a user interface presentable on the TV display. Yet again, the switch can be configured by manipulation of a key on the dock or TV. Still further, the switch can be configured by manipulation of a key on a TV remote control.

In another aspect, a system includes a TV display, a TV tuner configured to provide TV signals to the TV display, and a dock configured to hold a mobile telephony device. A switch has a first configuration in which signals from the TV tuner are sent to the TV display and a second configuration in which telephony device signals from the dock are sent to the TV display.

In another aspect, a method includes providing instructions to engage a dock with a TV. The method further includes providing instructions to engage a mobile telephony device with the dock, and presenting content from the telephony device on the TV.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
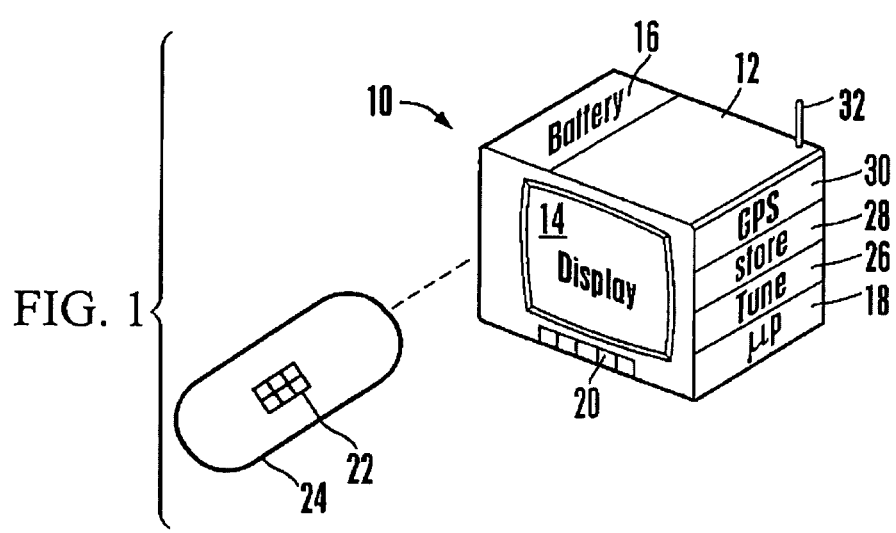
FIG. 1 is a block diagram of an example system in accordance with present principles.

Referring initially to FIG. 1, a system 10 includes a TV system 12 that in one implementation includes a TV chassis 14 holding a TV display 16 such as a standard definition and/or high definition display, e.g., a matrix-type flat panel display, with or without associated audio speakers. The display 16 under control of a TV processor 18 in the chassis 14 presents signals from a TV tuner 20 in the chassis 14, it being understood that the above components may be implemented in concert with, e.g., a set-top box.

The processor 18 accesses a computer-readable medium 22 such as solid state storage or disk-based storage. The processor 18 can receive, via a wireless IR or RF or other wireless receiver 24, wireless user command signals generated by a hand-held remote control 26. In some embodiments an Internet interface 28 may be included in the TV chassis 14 to enable programming from the Internet to be displayed in the TV system 12, it being understood that one or more of the TV components may be implemented by a separately housed set-top box. Without limitation the TV interface may be a wired or wireless modem.

In the non-limiting example embodiment shown the remote control 26 may include a "TV mode" select key 30, a "disk or other input" mode select key 32, and a "dock" mode select key 34. When a mode select key 30, 32, 34 is selected, the TV is configured to display input from the associated source, respectively, the tuner 20, a disk player, and the below-described mobile telephone dock.

Alternatively or in addition, a mode select toggle key 36 may be included on the TV 12. The toggle key 36 may be toggled to cycle between the above-mentioned example input sources for display on the TV system 12.

A mobile telephone dock 38 may communicate with the TV system 12 through a wired or wireless link 40, for example using a communication interface that seamlessly integrates phone functionality into the user interface of the TV. While a dock 38 that is physically separate from the TV is shown, in other embodiments the dock 38 may be embedded in the TV housing, i.e., the dock 38 may be part of the chassis of the TV.

As shown, the dock 38 includes a bay 42 that in example embodiments may be configured complementarily to a mobile telephone 44, i.e., the bay 42 may have the same contour as the mobile telephone 44 and may have substantially the same volume as the mobile telephone 44, such that the telephone 44 fits snugly in the bay 42. A contact 46 may be provided in the bay 42 as shown such that when the telephone 44 is disposed as intended in the bay 42, the contact 46 generates a "dock mode" signal that causes the TV system 12 to switch to using signals from the dock (and, hence, from the telephone 44 as described further below) as input for the TV display 16.

As understood herein, the mobile telephone 44, which includes a wireless telephony transceiver 48 controlled by a telephone processor 50 accessing instructions on a computer readable medium 52, typically has a relatively small display 54 that is smaller than the TV display 16. Also, the telephone 44 typically has a relatively small keyboard or keypad 56 that is smaller than (i.e., has keys of smaller area and/or fewer keys) than a keyboard or keypad 58 that in some example embodiments may be provided on the dock 38 or near the dock 38 and connected thereto by a wired or wireless link as described above. In some embodiments the dock 38 may further include a pointing and clicking device 59 such as a mouse or joystick. In some implementations the dock keyboard or keypad 58 is a conventional QWERTY arrangement although other arrangements can be made. In any case, the dock 38 may include a dock processor 60 accessing instructions on a computer readable medium 62.

In other implementations the telephone 44 may not mechanically engage the dock 38, but instead may be placed near the dock 38 and may communicate therewith through a wired or wireless link such as a USB link, a Bluetooth link, a 60 GHz wireless link, or other link.

When the telephone 44 is engaged with the dock 38 as intended in the example shown in FIG. 1, output from the telephone processor 50 is presented through the dock 38 on the TV display 16, while input to the telephone processor 50 may be made through the dock keyboard or keypad 58 and/or pointing and clicking device 59. To this end, the dock processor 60, when provided, can cooperate with the telephone processor 50 and as mentioned above may communicate with the dock processor 60 through a wired or wireless link or through direct contact between exposed connectors on the phone and dock.

Figure 2:
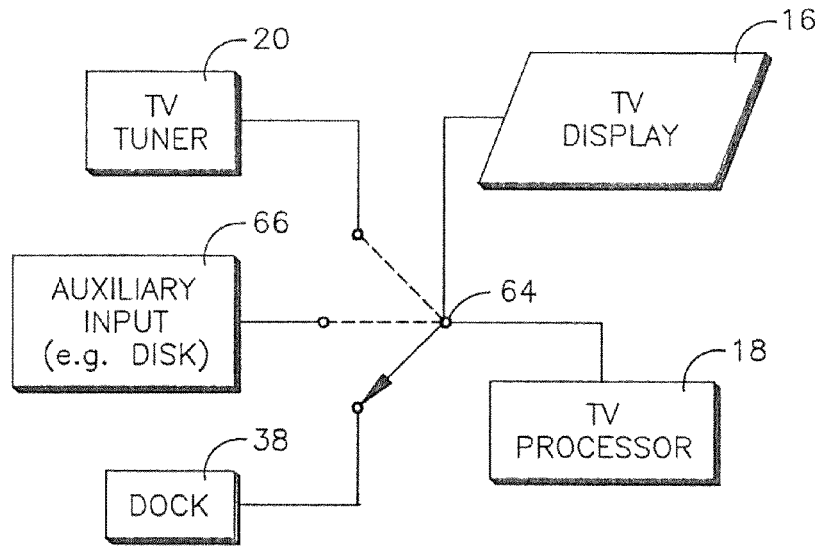
FIG. 2 is a block diagram of an example switching system to enable a TV to present demanded images from a mobile telephone.

FIG. 2 illustrates that in some implementations the input to the TV display 16 may be selected by means of a switch 64 under control of the TV processor 18. The switch 64, which may be physically implemented in a set-top box of the TV system 12 or within the TV chassis 14 by hardware or software or a combination thereof, may have a first position in which signals from the TV tuner 20 are sent to the TV display 16 for presentation. The switch 64 may have a second position in which signals from an auxiliary source such as a video disk player 66 are sent to the TV display 16, and a third position in which signals from the dock 38 and, hence, telephone 44 are sent to the TV display 16. It is to be understood that while for convenience a video TV display is referred to, audio signals from the telephone 44 including a caller's voice may likewise be presented on speakers of the TV system 12 in accordance with present principles. Telephone output signals can be presented on the TV by means of the dock for applications in addition to sending and receiving calls, e.g., receiving voice mail, reviewing text messages, writing text messages, address book manipulation, speed dialing configuration, or whatever else a user of the telephone might have a more comfortable experience doing using the TV displays than the telephone displays. Indeed, other applications executable by the telephone may be supported such as business presentations, word processing, spreadsheets, etc.

Figure 3:
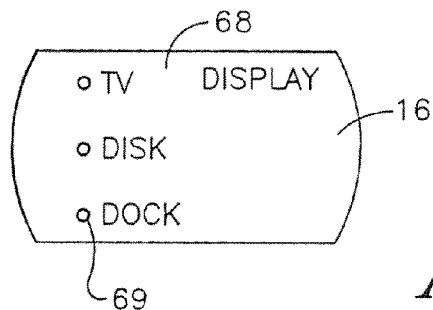
FIG. 3 is a schematic diagram of an example user interface presentable on a TV to enable selection of a mobile telephone dock input.

As may now be appreciated from the above disclosure, the switch 64 may be configured in the third position to send telephone 44 signals to the TV display 16 by any one or more of the dock contact 46 sensing engagement of the telephone 44 with the dock 38, the toggle key 36 on the TV chassis 14 being appropriately toggled, and the dock mode select key 36 on the remote 26 being manipulated. Additionally, as shown in. FIG. 3 user interface 68 may be presented on the TV display 16 when the TV system 12 is in, e.g., a set up mode in which a user may appropriately manipulate the remote control 26 to select an input for the TV display 16, including the dock 38 (and, hence, telephone 44) input 69 as shown.

Figure 4:
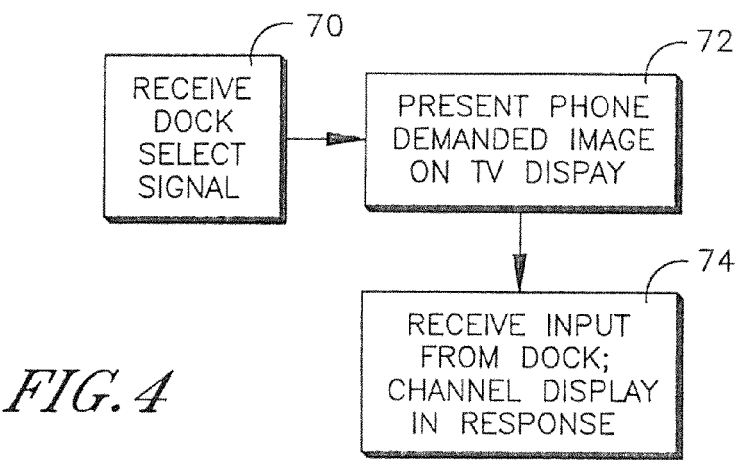
FIG. 4 is a flow chart of example logic that may be used in connection with a mobile telephone dock for a TV.

FIG. 4 shows logic that may be stored on one or more the computer readable media herein for execution by one or more the processors described herein. Commencing at block 70, a dock select signal is received in accordance with any one or more of the mechanisms described above. In response, at block 72 demanded images from the mobile telephone 44 are sent through the dock 38 for presentation on the TV display 16 by means of, e.g., appropriately configuring the switch 64. Also, input is received by the telephone processor 50 at block 74 from the dock keyboard or keypad 58, for permitting user control of the telephone 44 in executing applications thereon.

For example, the following telephone 44 applications, by way of example and not limitation, may be executed through the dock 38: email, word processing, presentation, browsing, etc. The dock 38 makes it more comfortable to access the applications, both visually and physically, allowing the user to have all his telephone 44 functionality when away from the dock 38 and with a better UI experience when using the dock 38.

In addition to the above, the dock 38 may provide power to the mobile telephone 44, for both charging and running. As understood herein, providing increased power through the dock 38 can allow the phone processor 50 and memory 52 to run at much higher speeds than they otherwise would when being powered solely by the telephone battery.

Furthermore, in some implementations the phone processor 50 may cooperate with the dock processor 60 to assist in processing and memory management.

In any case, it may now be appreciated that with the mobile telephone 44 engaged with the dock 38, telephony calls may be made in consonance with the TV system 12, e.g., demanded images from the telephone processor 50 related to incoming and outgoing telephony calls can be presented on the TV display 16, while input including numbers to be called may be made into the telephone 44 using the dock keyboard or keypad 58. Likewise, audio and video related to other telephone 44 applications can be presented on the TV system 12.

While the particular MOBILE PHONE DOCK FOR TV is herein shown and described in detail, it is to be understood that the subject matter which is encompassed by the present invention is limited only by the claims.

What is claimed is:
1. A system comprising:
  a dock communicating with a television (TV) comprising a TV display and a TV tuner, the dock configured to mount a mobile device, the dock communicating with the mobile device and operable to present an output from the mobile device on the TV display, and
  a switch operable to select input to the TV, the switch having a first configuration operable to select information from the TV tuner to be input to the TV for display, and the switch having a second configuration operable to select information from the dock to be input to the TV for display, wherein a representation of the switch is rendered on a graphical user interface of the TV display for selection between the first configuration and the second configuration.

2. The system of claim 1, wherein the dock comprises one or more of a keyboard, a keypad, and a remote control device.

3. The system of claim 1, wherein the TV comprises a chassis, and the dock is embedded in the chassis.

4. The system of claim 1, wherein the output comprises images associated with one or more computer applications executable by the mobile device.

5. The system of claim 1, wherein the switch is operable to send input from the dock to the TV display automatically when the mobile device is detected as being engaged with the dock in a predetermined docking position.

6. The system of claim 1, wherein the switch is selected by manipulation of a key on the dock or TV.

7. A system comprising:
a television (TV) display;
a TV tuner configured to provide TV signals to the TV display;
a dock configured to mount a mobile telephony device; and
a switch having a first configuration in which signals from the TV tuner are sent to the TV display and a second configuration in which mobile device signals from the dock are sent to the TV display, wherein a representation of the switch is rendered on a graphical user interface of the TV display for selection between the first configuration and the second configuration.

8. The system of claim 7, wherein signals associated with one or more of placing or receiving telephone calls, receiving voice mail, reviewing text messages, writing text messages, address book manipulation, and speed dialing configuration are presented on the TV display.

9. The system of claim 7, wherein the dock comprises one or more of a keyboard, a keypad and a remote control device.

10. The system of claim 7, wherein the dock comprises a point and click input device.

11. The system of claim 7, wherein images associated with one or more computer applications executable by the mobile device are presented on the TV display.

12. The system of claim 7, wherein the switch is operable to send input from the dock to the TV display automatically when the mobile device is detected as being engaged with the dock in a predetermined docking position.

13. The system of claim 7, wherein the switch is selected by manipulation of a key on the dock or TV.

14. The system of claim 7, wherein the switch is selected by manipulation of a key on a TV remote control.

15. A method comprising:
in a dock operatively communicating with a television (TV) comprising a TV tuner and a TV display:
detecting a mobile device upon engagement of the mobile device with the dock;
and
configuring a switch operable to select between a first configuration that connects a TV tuner to a TV display and a second configuration that connects the dock to the TV display, wherein a representation of the switch is rendered on a graphical user interface of the TV display for selection between the first configuration and the second configuration.

16. The method of claim 1, wherein the mobile device is engaged with the dock to make telephone calls on the TV.

17. The system of claim 1, wherein an incoming voice call on the mobile device is presented on the TV display and speakers of the TV.

* * * * *